(12) United States Patent
Tominaga

(10) Patent No.: US 8,467,491 B2
(45) Date of Patent: Jun. 18, 2013

(54) FEEDWATER CONTROLLER, NUCLEAR POWER PLANT AND METHOD FOR CONTROLLING FEEDWATER

(75) Inventor: Shinya Tominaga, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 106 days.

(21) Appl. No.: 11/878,429

(22) Filed: Jul. 24, 2007

(65) Prior Publication Data

US 2008/0031394 A1 Feb. 7, 2008

(30) Foreign Application Priority Data

Jul. 28, 2006 (JP) ................. 2006-205775

(51) Int. Cl.
*G21C 7/36* (2006.01)
(52) U.S. Cl.
USPC ............ 376/215; 376/210; 376/216; 376/217
(58) Field of Classification Search
USPC .................. 376/361, 210, 215–217
See application file for complete search history.

(56) References Cited

U.S. PATENT DOCUMENTS

| 4,650,633 | A | * | 3/1987 | Youngborg | 376/210 |
| 4,651,530 | A | * | 3/1987 | Omori | 60/667 |
| 5,293,411 | A | * | 3/1994 | Miyamoto et al. | 376/210 |
| 5,566,709 | A | * | 10/1996 | Fujii et al. | 137/487.5 |
| 5,960,049 | A | * | 9/1999 | Wilkosz et al. | 376/210 |
| 2003/0038706 | A1 | * | 2/2003 | Nakatsu et al. | 338/49 |
| 2006/0256912 | A1 | * | 11/2006 | Katayama et al. | 376/277 |

FOREIGN PATENT DOCUMENTS

| JP | 58088482 | A | * | 5/1983 |
| JP | 61-75296 | A | | 4/1986 |
| JP | 63282695 | A | * | 11/1988 |
| JP | 01109300 | A | * | 4/1989 |
| JP | 06-003491 | | | 1/1994 |
| JP | 06003491 | A | * | 1/1994 |
| JP | 6-102394 | A | | 4/1994 |
| JP | 08-110392 | | | 4/1996 |
| JP | 9-145894 | A | | 6/1997 |

OTHER PUBLICATIONS

Machine Translation of Goshima et al. (JP 06003491 A1).*
Kurata et al., Thyristor Inverters for Induction Heating and Recent Applications, 2001, Fuji Electric Journal, vol. 74, No. 5, p. 1 (abstract).*

* cited by examiner

*Primary Examiner* — Timothy A Brainard
(74) *Attorney, Agent, or Firm* — Foley & Lardner LLP

(57) ABSTRACT

The feedwater controller of a nuclear power plant having three or more feedwater pumps supplying water to the reactor vessel, electric motors driving the feedwater pumps and electric power converters connected to the electric motors is equipped with a flow rate controller and a trip compensation means. The flow rate controller calculates a flow rate to the reactor vessel based on a detected value indicating a condition of the nuclear power plant and a preset value of the water level of the reactor vessel, and generates a rotation speed command signal for the electric motors based on the flow rate command signal. The trip compensation means increases the rotation speed of the electric motors not having tripped if one of the feedwater pumps trips.

15 Claims, 11 Drawing Sheets

FEEDWATER CONTROLLER, NUCLEAR POWER PLANT AND METHOD FOR CONTROLLING FEEDWATER

CROSS REFERENCE TO RELATED APPLICATION

This application is based upon and claims the benefit of priority from the prior Japanese patent application No. 2006-205775 filed on Jul. 28, 2006; the entire content of which is incorporated here by reference.

BACKGROUND OF THE INVENTION

The present invention relates to a feedwater controller, a nuclear power plant equipped therewith and a method for controlling feedwater.

As a controlling method of a feedwater flow rate to a nuclear reactor, a rotation speed control of a reactor feedwater pump driven by a turbine and feedwater flow rate adjustment valve control of a reactor feedwater pump driven by an electric motor are known.

On the other hand, a feedwater apparatus using a feedwater pump driven by an electric motor whose rotation speed is variable, with an electric power converter has been studied (for example, see Japanese Patent Publication Sho 61-59479) (entire content of which is incorporated here by reference). With this feedwater apparatus, when one of the reactor feedwater pumps driven by the electric motors falls into a condition that water cannot be supplied according to a certain cause (trip), a backup reactor feedwater pump driven by the electric motor is started up quickly and activated for a backup by an interlock.

A quick start of the electric motor requires larger current than normal operation. On the other hand, a current which can be supplied to the electric power converter is limited, and only limited current can be supplied to the electric motor. Therefore, it takes a certain time for the electric motor to complete the start up. However, since a power supply of a capacity more than that required for a normal operation must be installed, it is not economical to install the power supply which can supply current required for the start up of the electric motor quickly.

Therefore, without a large-scale power supply, when a signal of a backup start up is transmitted, it takes typically about 10 seconds for the backup feedwater pump and the electric motor driving it to reach a minimum rotation speed from a halt condition, and takes about 15 seconds to reach a rated rotation speed.

The trip of one of the feedwater pumps causes a rapid decrease of feedwater flow rate. On the other hand, because the backup feedwater pump started up for a backup has a characteristics of slow start up, it takes a long time to reach a rated flow rate. Therefore, in spite of the installation and the start up of the backup feedwater pump, it is possible that a water level of the reactor continues falling and the nuclear reactor scrams.

As described above, with the feedwater apparatus equipped with the feedwater pump driven by a variable rotation speed electric motor using the electric power converter, it is difficult to start up the electric motor driving the backup feedwater pump quickly. Therefore, there is a problem that the feedwater flow rate to the nuclear reactor falls temporarily when one of the feedwater pumps trips.

Conventionally, a malfunction of the electric power converter among trip factors of the feedwater pump is detected by a self-diagnosis of the electric power converter. Therefore, depending on the status of the malfunction of the electric power converter, the self-diagnosis may not work normally, and the malfunction may not be detected. In this case, the backup feedwater pump of the nuclear reactor driven by the electric motor may not start up for a backup, and the feedwater flow rate may decrease, so the reactor water level also continues falling and the nuclear reactor may scram.

BRIEF SUMMARY OF THE INVENTION

The present invention has an object to reduce possibility that a nuclear reactor scrams when a feedwater pump trips.

According to an aspect of the present invention, there is provided a feedwater controller of a nuclear power plant having three or more feedwater pumps supplying water to a nuclear steam supply system generating steam with heat generated in a nuclear reactor, electric motors driving the feedwater pumps and electric power converters connected to the electric motors, the feed water controller comprising: a water level controller calculating a feedwater flow rate to the nuclear steam supply system and outputting as a feedwater flow rate command signal based on a detected value indicating a condition of the nuclear power plant and a setpoint of a water level of the nuclear steam supply system; a flow rate controller generating a rotation speed command signal of the electric motor based on the feedwater flow rate command signal; and a trip compensation means for increasing a rotation speed of the electric motor driving at least one of the feedwater pumps not having tripped if one of the feedwater pumps trips.

According to another aspect of the present invention, there is provided a nuclear power plant, comprising: a nuclear steam supply system producing steam with heat generated in a nuclear reactor; a power generating turbine driven with the steam supplied by the nuclear steam supply system;

a condenser condensing the steam after driving the power generating turbine; feedwater pumps supplying water condensed and generated by the condenser to the nuclear steam supply system; a water level controller calculating a feedwater flow rate to the nuclear steam supply system and outputting as a feedwater flow rate command signal based on a detected value indicating a condition of the nuclear power plant and a setpoint of a water level of the nuclear steam supply system; a flow rate controller generating a rotation speed command signal of the electric motor based on the feedwater flow rate command signal; and a trip compensation means for increasing a rotation speed of the electric motor driving at least one of the feedwater pumps not having tripped if one of the feedwater pumps trips.

According to yet another aspect of the present invention, there is provided a feedwater controlling method of a nuclear power plant having three or more feedwater pumps supplying water to a nuclear steam supply system generating steam with heat generated in a nuclear reactor, electric motors driving the feedwater pumps and electric power converters connected to the electric motors, the method comprising: calculating a feedwater flow rate to the nuclear steam supply system and outputting as a feedwater flow rate command signal based on a detected value indicating a condition of the nuclear power plant and a setpoint of a water level of the nuclear steam supply system; generating a rotation speed command signal of the electric motor based on the feedwater flow rate command signal; and increasing a rotation speed of the electric motor driving at least one of the feedwater pumps not having tripped if one of the feedwater pumps trips.

BRIEF DESCRIPTION OF THE DRAWINGS

The above-described characteristics and advantages and other characteristics and advantages of the present invention will become apparent from detailed description of the embodiments of the present invention given below by referring to the accompanying drawings, in which.

DETAILED DESCRIPTION OF THE INVENTION

Hereinafter, embodiments of the feedwater controller according to the present invention are described with reference to the drawings. The same symbols are given to same or similar configurations, and duplicated descriptions are omitted.

First Embodiment

Figure 1:
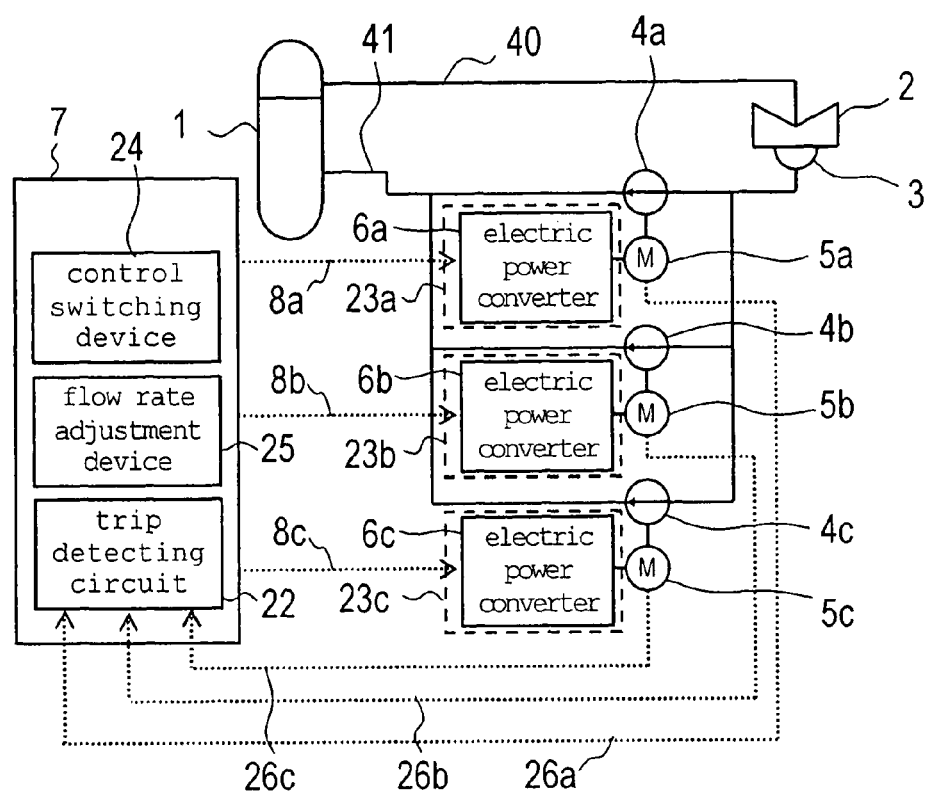
FIG. 1 is a system diagram of the nuclear power plant according to the first embodiment of the present invention.

FIG. 1 is a system diagram of the nuclear power plant according to the first embodiment of the present invention.

The nuclear power plant has a reactor vessel 1 containing a reactor core and a power generating turbine 2. A condenser 3 is connected to the power generating turbine 2. The reactor vessel 1 and the power generating turbine 2 are connected with a main steam piping 40. The condenser 3 and the reactor vessel 1 are connected with each other by a feedwater piping 41. The feedwater piping 41 is separated into three parallel pipes and feedwater pumps 4a, 4b, 4c are inserted in the parallel pipes.

The feedwater pumps 4a, 4b, 4c are driven by electric motors 5a, 5b, 5c. The rotation speeds of the electric motors are variable.

Each of the three feedwater pumps 4a, 4b, 4c has at least 50% capacity of the total water supply to the reactor vessel 1. During a start up, a shut down or a normal operation, two of three feedwater pumps 4a, 4b, 4c are used as primary feedwater pumps operated usually, and the other is used as a backup feedwater pump. Induction motors or synchronous motors can be used as electric motors 5a, 5b, 5c for driving the feedwater pumps 4a, 4b, 4c.

In the following description, symbols 4a and 4b indicate the primary feedwater pumps, and symbols 4c indicates the backup feedwater pump. It is possible to configure any two of three feedwater pumps 4a, 4b, 4c to use as the primary feedwater pumps.

Steam produced by heat generated in the nuclear reactor is sent from the reactor vessel 1 to the power generating turbine 2 through the main steam piping 40 and drives the power generating turbine 2. After driving the power generating turbine 2, the steam is condensed into water by the condenser 3, and the water is supplied to the reactor vessel 1 again through the water supply piping 41.

Although it is explained here with the nuclear power plant having a boiling water reactor (BWR) for an example, this embodiment is applicable to the nuclear reactor which has a nuclear steam supply system to which water is supplied with a feedwater pump, for example, a pressurized water reactor (PWR) etc.

A feedwater controller 7 has a trip detecting circuit 22, a flow rate adjustment device 25, and a control switching device 24. The feedwater controller 7 receives signals, such as motor rotation speed signals 26a, 26b, 26c from electric motors 5a, 5b, 5c driving feedwater pumps 4a, 4b, 4c, and transmits signals such as rotation speed command signals 8a, 8b, 8c to electric power converters 6a, 6b, 6c via backup startup circuits 23a, 23b, 23c.

Figure 2:
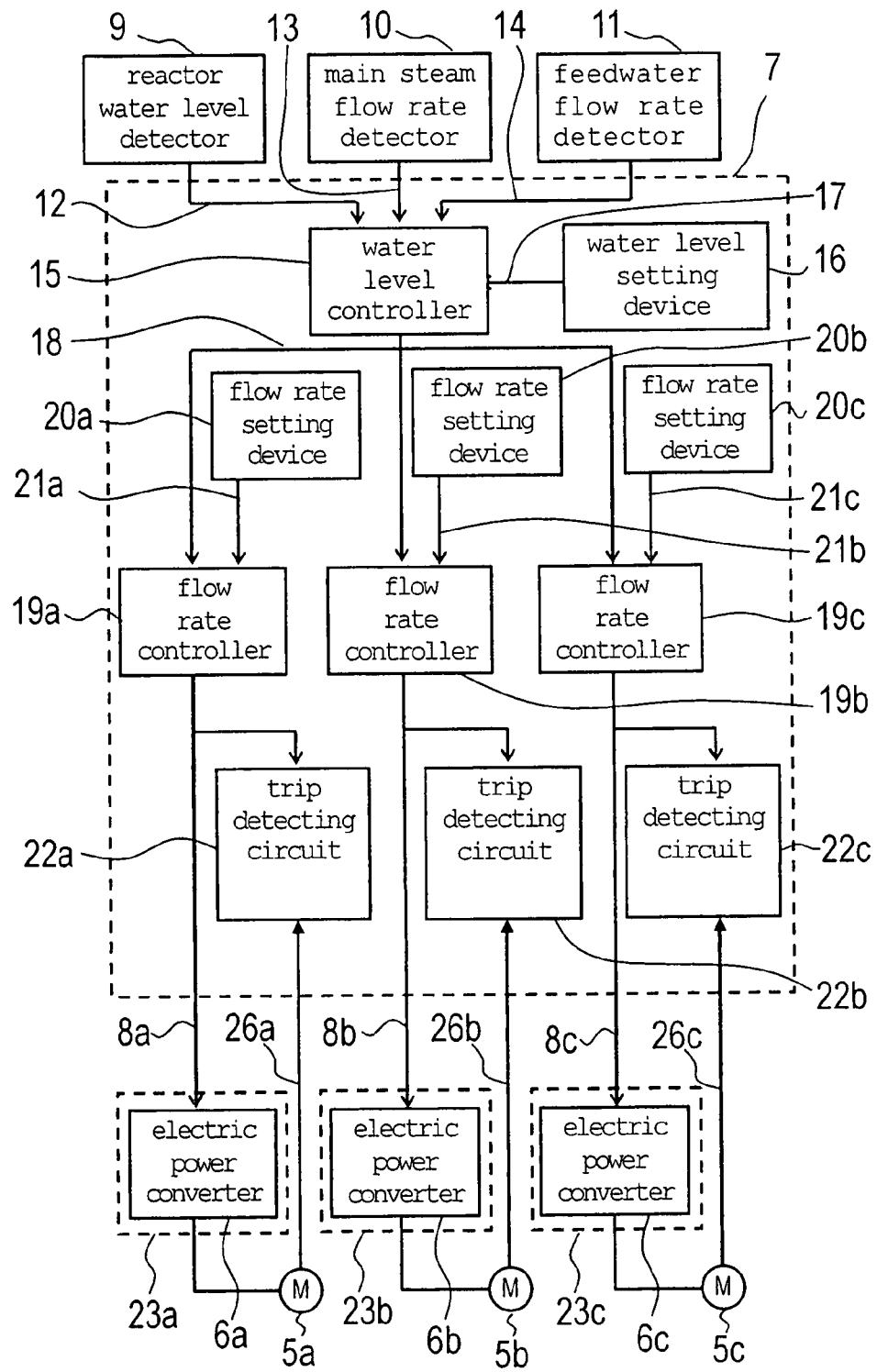
FIG. 2 is a block diagram of a part of the feedwater controller according to the first embodiment of the present invention.

FIG. 2 is a block diagram of a part of the feedwater controller according to the first embodiment of the present invention.

The feedwater controller 7 has a water level controller 15 and a water level setting device 16. And it has flow rate controllers 19a, 19b, 19c that transmit rotation speed command signals 8a, 8b, 8c to three electric power converters 6a, 6b, 6c. And it has flow rate setting devices 20a, 20b, 20c corresponding to each flow rate controllers 19a, 19b, 19c.

The water level controller 15 receives a reactor water level signal 12 from a reactor water level detector 9, a main steam flow rate signal 13 from a main steam flow rate detector 10, a reactor feedwater flow rate signal 14 from the feedwater flow rate detector 11, and a reactor water level setpoint signal 17 from the water level setting device 16. The water level controller 15 calculates the main steam flow rate signal 13 and the feedwater flow rate signal 14 based on the water level detection signal 12, and outputs a feedwater flow rate command signal 18 appropriate to the reactor water level setpoint signal 17 by comparing the calculated result with the reactor water level setpoint signal 17.

The flow rate controllers 19a, 19b, 19c transmit the rotation speed command signals 8a, 8b, 8c to the electric power converters 6a, 6b, 6c by receiving the feedwater flow rate command signal 18 or the flow rate set signals 21a, 21b, 21c transmitted from the flow rate setting devices 20a, 20b, 20c. In other words, the nuclear reactor feedwater flow rate is controlled by controlling the rotation speed of the electric motors 5a, 5b, 5c, i.e., the rotation speed of the feedwater pumps 4a, 4b, 4c by adjusting the frequency of the electric power converters 6a, 6b, 6c.

The feedwater controller 7 also has trip detecting circuits 22a, 22b, 22c corresponding to each electric motors 5a, 5b, 5c driving the three feedwater pumps 4a, 4b, 4c. The trip detecting circuits 22a, 22b, 22c decide whether the feedwater pumps 4a, 4b, 4c trip or not, based on the rotation speed command signals 8a, 8b, 8c and the motor rotation speed signals 26a, 26b, 26c of the electric motors 5a, 5b, 5c.

Figure 3:
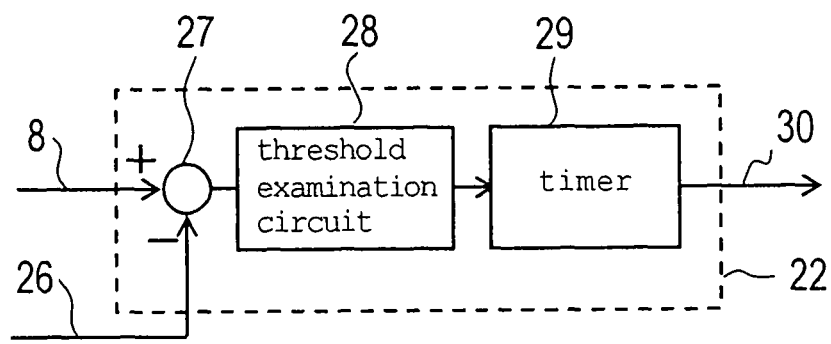
FIG. 3 is a block diagram of the trip detecting circuit according to the first embodiment of the present invention.

FIG. 3 is a block diagram of the trip detecting circuit according to the first embodiment of the present invention. Although the feedwater controller 7 has three trip detecting circuits 22a, 22b, 22c corresponding to three feedwater pumps 4a, 4b, 4c, FIG. 3 illustrates only one circuit of them.

Symbols "a", "b", and "c" show that they are an instrument or a circuit, etc. corresponding to the three feedwater pumps, respectively, and symbols "a", "b", and "c" are omitted in FIG. 3.

The trip detecting circuit 22 has a subtraction device 27, a threshold examination circuit 28 and a timer 29. The trip detecting circuit 22 receives the rotation speed command signal 8 and the motor rotation speed signal 26, and the subtraction device 27 calculates a deviation of them. The threshold examination circuit 28 decides whether this deviation is allowable or not. If it is not allowable, a signal is outputted to the timer 29. The timer 29 outputs pump trip signal 30, if this signal continues for more than a predetermined period. To avoid an unnecessary trip decision, the period until the output of the pump trip signal 30 is set to be more than a period within which the electric power converter 6c can be restored by restarting.

Although the trip detecting circuits 22 are installed corresponding to all the feedwater pumps 4a, 4b, 4c in this embodiment, they may be installed only corresponding to the primary feedwater pumps 4a and 4b.

As described above, the feedwater controller 7 of this embodiment compares the rotation speed command signal 8 with the motor rotation speed 26, and decides that a pump having tripped and outputs the pump trip signal 30 if the situation of the large deviation continues. Therefore, it is possible to detect an impossibility of feeding water and to start the backup feedwater pump 4c when the electric power converters 6a, 6b fall into out of order without the self-diagnosis function of the electric power converters 6a, 6b. So, a possibility of resulting in scram by a reactor water level low can be reduced. Also, since the timer 29 is installed, an unnecessary trip of the feedwater pump does not occur if the electric power converter 6c can be restored by restart.

Figure 4:
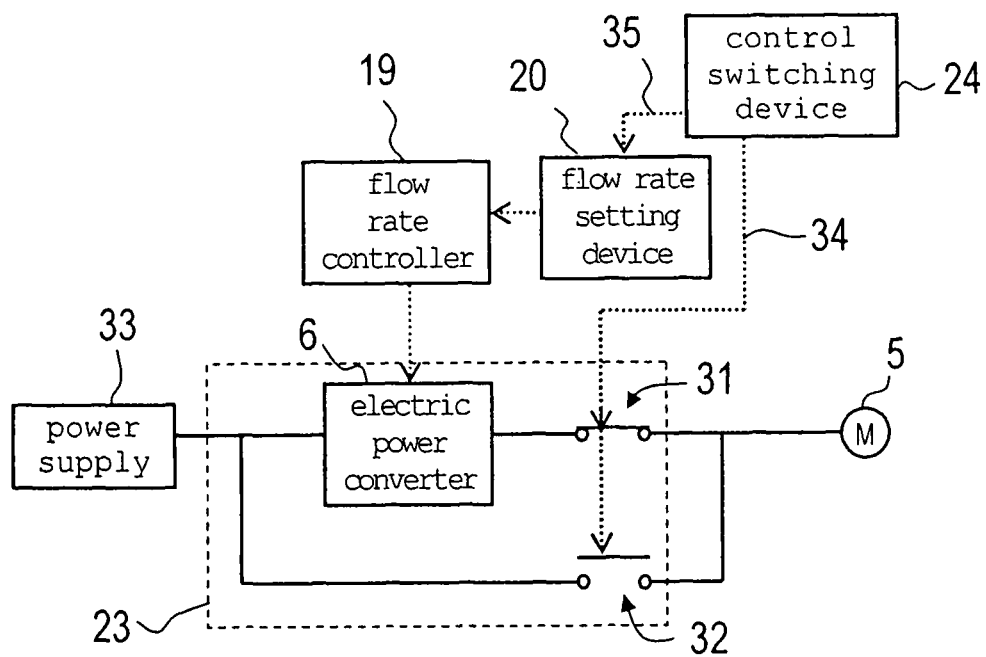
FIG. 4 is a block diagram around the backup start up circuit and control switching device according to the first embodiment of the present invention.

FIG. 4 is a block diagram around the backup start up circuit and control switching device according to the first embodiment of the present invention. Although the feedwater controller 7 has three backup start up circuits 23a, 23b, 23c and control switching devices 24a, 24b, 24c corresponding to three feedwater pumps 4a, 4b, 4c, each one of them are shown in FIG. 4. Symbols "a", "b", and "c" indicate that they are an instrument or a circuit, etc. corresponding to the three feedwater pumps, respectively, and symbols "a", "b", and "c" are omitted in FIG. 4.

The backup start up circuit 23 has the electric power converter 6, an electric power converter control switch 31 and a backup start up switch 32. The backup start up circuit 23 is connected with a power supply 33 whose frequency is about 50 Hz or 60 Hz supplied from the voltage transformation bus line of the power plant.

In case certain feedwater pumps are operated as primary feedwater pumps 4a, 4b, the electric power converter control switch 31 of backup start up circuit 23 is turned ON, the backup start up switch 32 is turned OFF, and the electric motors 5 driving these feedwater pumps are controlled by the electric power converter 6 with a rotation speed control.

On the other hand, in case a certain feedwater pump is used as the backup feedwater pump 4c, the electric power converter control switch 31 of backup start up circuit 23 is turned OFF, the backup start up switch 32 is turned ON, and the electric motor 5 driving this feedwater pump is directly driven by the power supply 33 without electric power converter 6.

That is, when the feedwater pump under operation is decided as trip, the feedwater controller 7 of this embodiment increases the rotation speed of the electric motor 5c driving the backup feedwater pump 4c not having tripped and compensates the decrease of feedwater flow rate according to the trip. More specifically, the backup feedwater pump 4c is started up quickly using the power supply 33 directly and is operated at the voltage and the frequency of the power supply 33 by the backup start up circuit 23. That is, the backup feedwater pump can be started up quickly without installing a large-scale electric power converter. As described above, since quick start becomes possible without being restrained by the output current limitation of the electric power converter 6, it becomes possible to select what has the optimal capacity as the electric power converter 6 and it is economical.

The control switching device 24 outputs a rated-flow setpoint signal 35 corresponding to the rotation speed operated with the power supply 33 to the flow rate setting device 20 which controls the electric power converter 6c corresponding to the backup feedwater pump 4c having started up for a backup. The flow rate setting device 20 of the feedwater pump is set up to output the flow rate setting signal corresponding to the rotation speed of the operation with the power supply 33 to the flow rate controller 19.

After the control switching device 24 turns OFF the backup start up switch 32 by outputting a switch command signal 34, it switches the power supply for driving the backup feedwater pump from the power supply 33 to the electric power converter 6 by turning ON the electric power converter control switch 31. The rotation speed of the electric motor 5 decreases by switching at first. Then, according to the rotation speed command signal corresponding to the rotation speed of the operation with the power supply 33 transmitted from flow rate controller 19 of the feedwater pump, the rotation speed returns to that of before switching.

The backup start up circuit 23 and the control switching device 24 are installed corresponding to all the feedwater pumps 4a, 4b, 4c in this embodiment, it may be installed corresponding only to the backup feedwater pump 4c.

Figure 5:
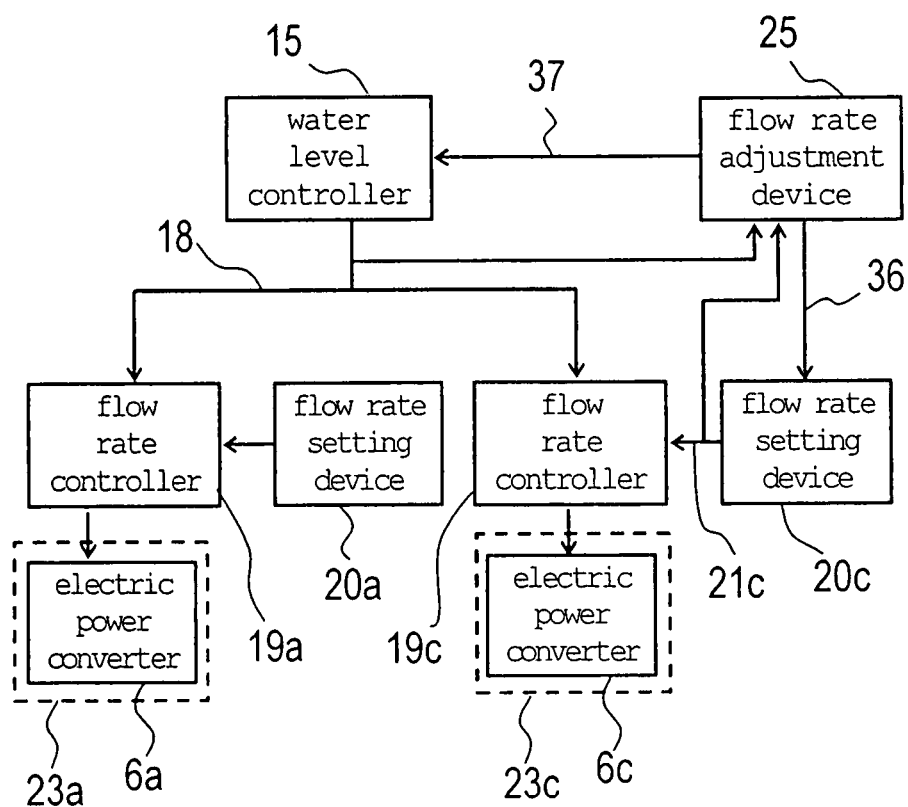
FIG. 5 is a block diagram of the flow rate adjustment device according to the first embodiment of the present invention.

FIG. 5 is a block diagram of the flow rate adjustment device according to the first embodiment of the present invention.

Here, a case where the feedwater pump indicated by symbol 4b trips and the backup feedwater pump indicated by symbol 4c start up for a backup will be described.

The flow rate adjustment device 25 outputs a correction signal 37 to the water level controller 15 with a decrease signal 36. The decrease signal 36 decreases at a constant rate a flow request signal for the flow rate controller 19c controlling the electric power converter 6c corresponding to the feedwater pump 4c having started up for a backup. The correction signal 37 is a signal having the same absolute value and the opposite sign to the decrease signal 36. The flow rate adjustment device 25 calculates a deviation of the feedwater supply command signal 18 transmitted by the water level controller 15 from the flow rate setting signal 21c. If this deviation is in a tolerance, the flow rate adjustment device 25 stops outputting the decrease signal 36 and the correction signal 37, and switches the input for the flow rate controller 19c into the feedwater supply command signal 18 from the flow rate setting signal 21c. It is controlled that the flow rate of the backup feedwater pump 4c having started for a backup decreases as the flow rate of other feedwater pumps increases.

Since the operation of the backup feedwater pump 4c is switched from the operation at the nominal rotation speed into the controlled operation by the electric power converter 6c automatically and also followed by the operation according to the feedwater supply command signal 18 automatically, the nuclear reactor feedwater can be supplied at stable flow rate continuously. And the load of operation on an operator is small.

Thus, with the feedwater controller of this embodiment, a situation that a feedwater can not be supplied because of the malfunction of the electric power converter can be detected and the feedwater pump can be started up for a backup without a self-diagnosis function of the electric power converter. So, the possibility of the scram according to a reactor water level low can be reduced. The backup feed water pump can be started up more quickly than by the electric power converter, and the possibility of the scram according to a reactor water level low can be reduced. Since a quick start becomes possible without being restrained by the output current limitation of the electric power converter, it becomes possible to select the power supply of the most optimal capacity, and it is economical.

Second Embodiment

Figure 6:
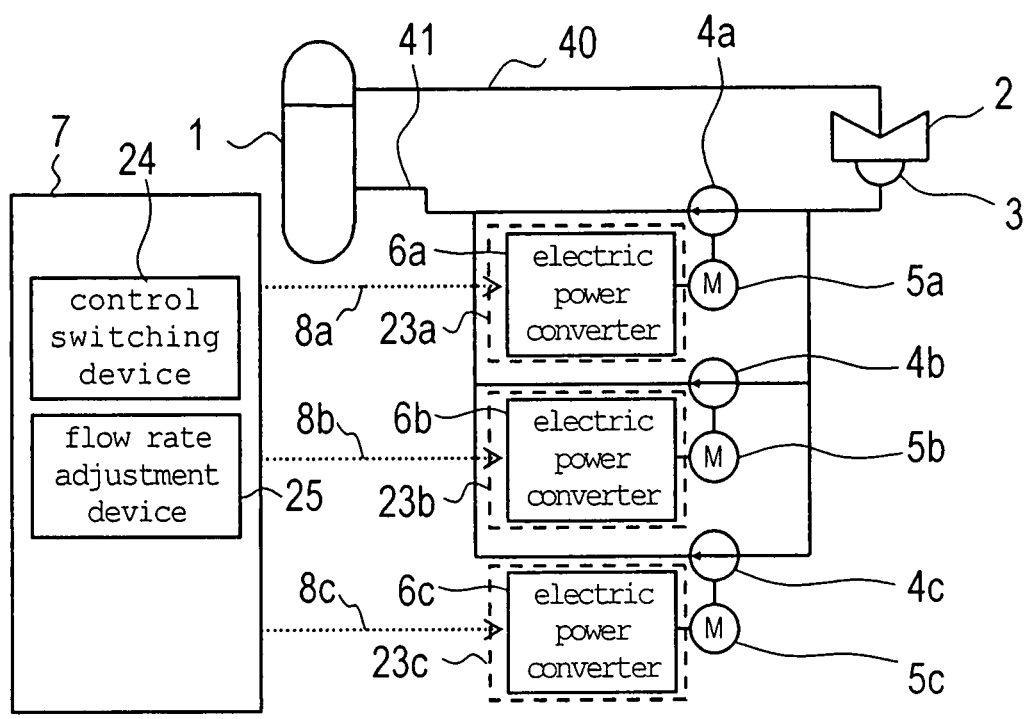
FIG. 6 is a system diagram of the nuclear power plant according to the second embodiment of the present invention.

FIG. 6 is a system diagram of the nuclear power plant according to the second embodiment of the present invention.

The feedwater controller of this embodiment is same as the feedwater controller of the first embodiment except that the trip detecting circuit is excluded.

Also in this embodiment, if the feedwater pump under operation is decided as having tripped, for example by an electric power converter's own self-diagnosis, the backup feedwater pump is started up quickly by the backup start up circuit using the power supply 33 (FIG. 4), and is operated at the voltage and the frequency of the power supply 33 (FIG. 4). Therefore, when one of the primary feedwater pumps trips, the backup feed water pump can be started up more quickly than by the electric power converter, and the possibility of the scram according to the reactor water level low can be reduced. Since the quick start becomes possible without being restrained by the output current limitation of the electric power converter, it is possible to select the power supply of the most optimal capacity, and it is economical.

The rotation speed of the electric motor 5 decreases by switching at first, and it returns to that of before switching, according to the rotation speed command signal corresponding to the rotation speed of the operation with the power supply 33 (FIG. 4) transmitted from flow rate controller 19 (FIG. 4) of the feedwater pump. Since the operation of the backup feedwater pump having started up is switched from the operation at the nominal rotation speed into the controlled operation by the electric power converter automatically and also followed by the operation according to the feedwater supply command signal automatically, the nuclear reactor feedwater can be supplied at stable flow rate continuously. And the load of operation on an operator is small.

And it is controlled that the flow rate of the backup feedwater pump having started for a backup decreases as the flow rate of other feedwater pumps increases. Also, by making the feedwater flow rate command of the pump in operation increase at a rate corresponding to the decrease of the backup in advance, the total feedwater flow rate is kept stable and the fluctuation of the reactor water level can be suppressed.

Third Embodiment

Figure 7:
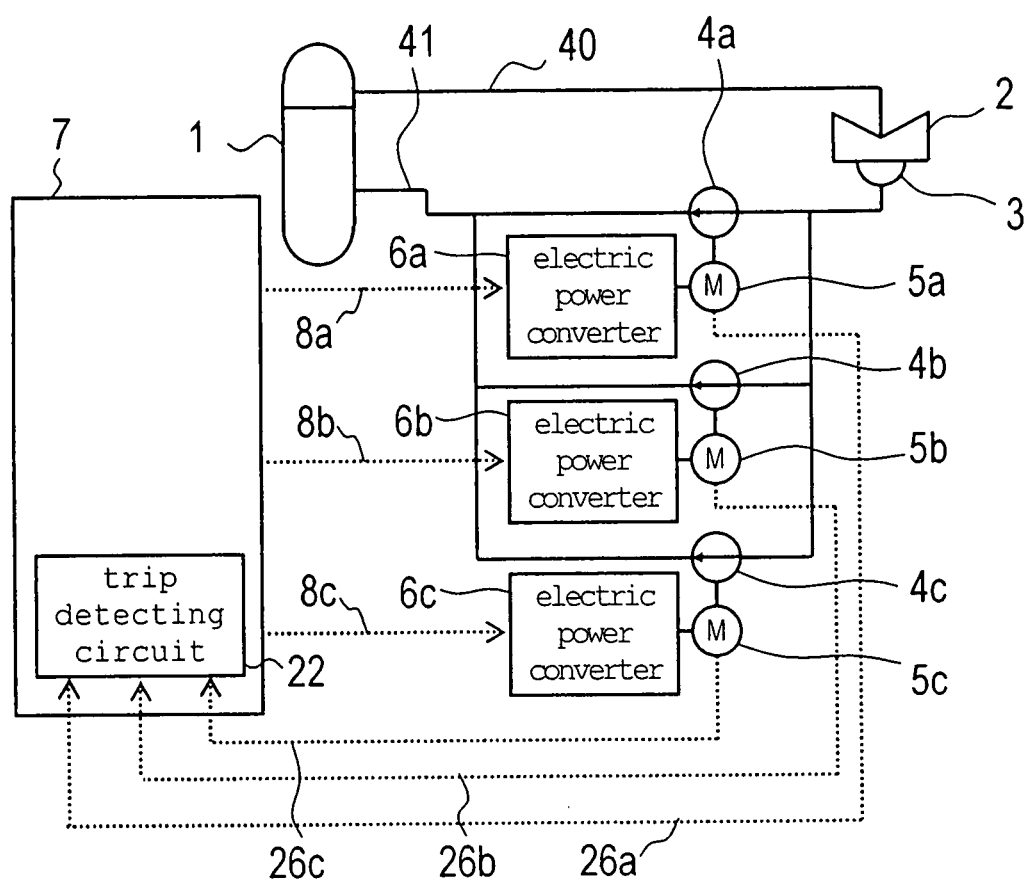
FIG. 7 is a system diagram of the nuclear power plant according to the third embodiment of the present invention.

FIG. 7 is a system diagram of the nuclear power plant according to the third embodiment of the present invention.

The feedwater controller 7 of this embodiment is same as the first embodiment except that the backup start up circuit, the control switching device, and the flow rate adjustment device are excluded.

In this embodiment, the rotation speed command signals 8a, 8b, 8c are compared with the rotation speed of the electric motors 5a, 5b, 5c, and it is decided as a pump trip and the pump trip signal 30 is outputted if the situation of the large deviation continues. Therefore, it is possible to detect an impossibility of feeding water and to start the backup feedwater pump 4c when the electric power converters 6a, 6b, 6c fall into out of order without the self-diagnosis function of the electric power converters 6a, 6b, 6c. So, a possibility of resulting in scram by a reactor water level low can be reduced. Also, since the timer 29 is installed, an unnecessary trip of the feedwater pump does not occur if the electric power converter 6c can be restored by restart.

Fourth Embodiment

Figure 8:
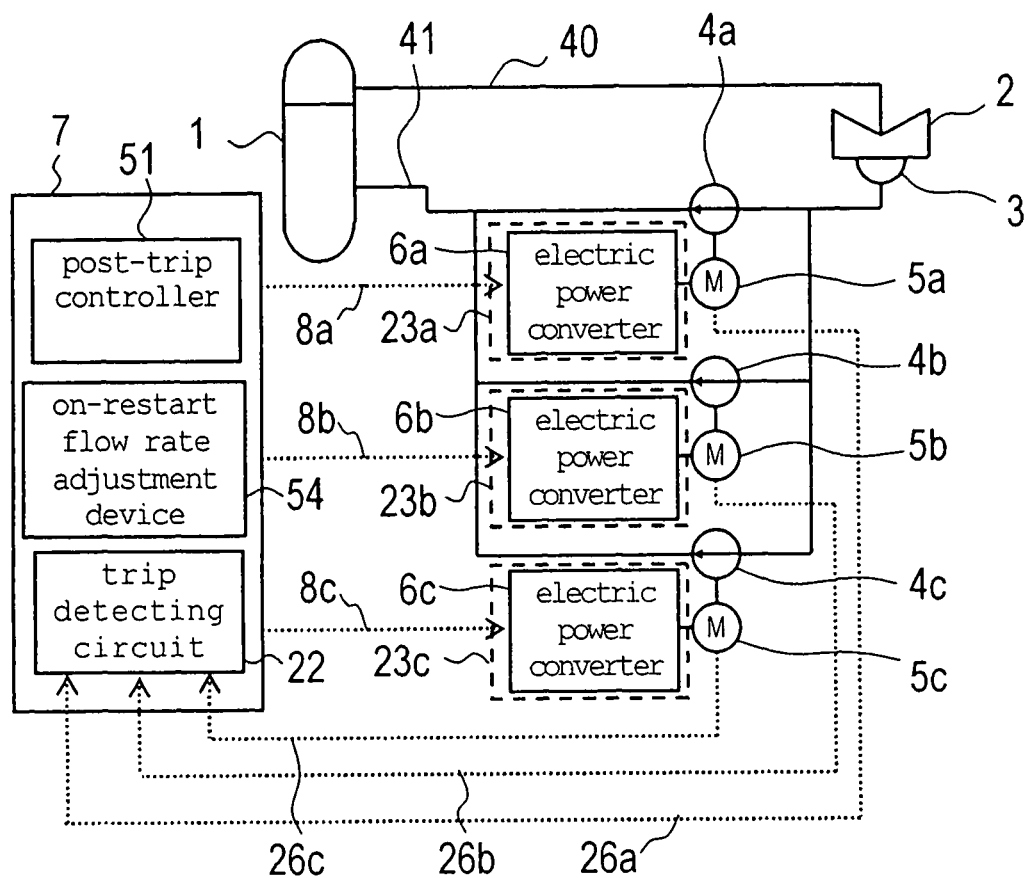
FIG. 8 is a system diagram of the nuclear power plant according to the fourth embodiment of the present invention.

FIG. 8 is a system diagram of the nuclear power plant according to the fourth embodiment of the present invention.

In the nuclear power plant of this embodiment, all of three feedwater pumps 4a, 4b, 4c have capacity of not less than 50% capacity of the total water supply respectively, and are operated as the primary feedwater pumps. That is, during the normal operation, each of the feedwater pumps 4a, 4b, 4c supplies water of ⅓ of the total feedwater flow.

The feedwater controller 7 of this embodiment has the trip detecting circuit 22, the flow rate adjustment device 25 and a post-trip controller 51. The feedwater controller 7 receives signals such as the motor rotation speed signals 26a, 26b, 26c from the electric motors 5a, 5b, 5c driving the feedwater pumps 4a, 4b, 4c. Signals such as the rotation speed command signals 8a, 8b, 8c are transmitted to the electric power converters 6a, 6b, 6c via the backup start up circuits 23a, 23b, 23c.

Figure 9:
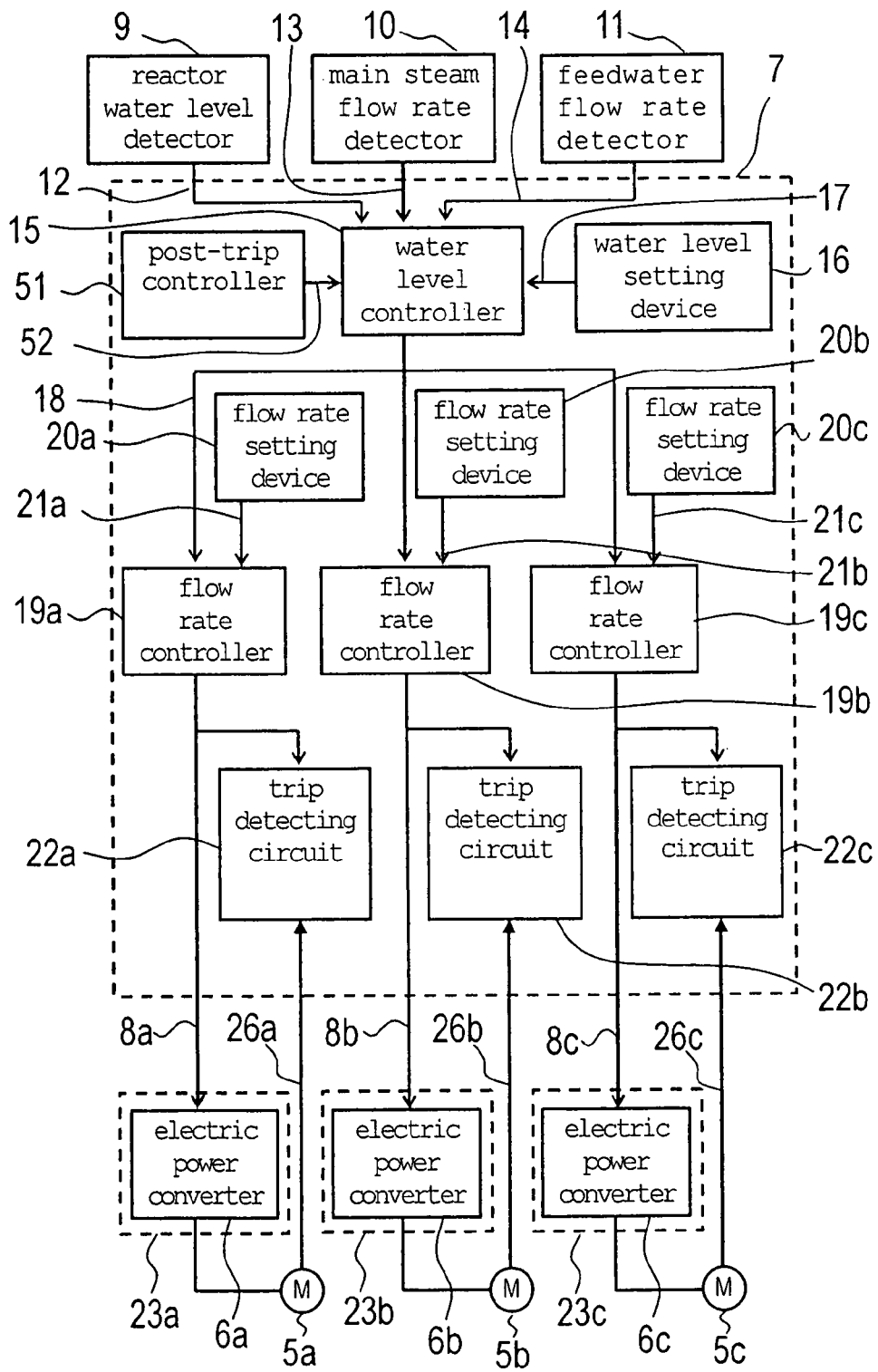
FIG. 9 is a block diagram of a part of the feedwater controller according to the fourth embodiment of the present invention.

FIG. 9 is a block diagram of a part of the feedwater controller according to the fourth embodiment of the present invention.

The feedwater controller 7 has the water level controller 15, the water level setting device 16 and the post-trip controller 51. It also has the flow rate controllers 19a, 19b, 19c transmitting the rotation speed command signals 8a, 8b, 8c to the three electric power converters 6a, 6b, 6c. It also has the flow rate setting devices 20a, 20b, 20c corresponding to each of the flow rate controller 19a, 19b, 19c. The feedwater controller 7 also has the trip detecting circuits 22a, 22b, 22c corresponding to the electric motors 5a, 5b, 5c driving the three feedwater pumps 4a, 4b, 4c, like the first embodiment (see FIG. 3).

The water level controller 15 receives the reactor water level signal 12 from the reactor water level detector 9, the main steam flow rate signal 13 from the main steam flow rate detector 10, the reactor feedwater flow rate signal 14 from the feedwater flow rate detector 11, and the reactor water level setpoint signal 17 from the water level setting device 16. When one of the feedwater pumps 4a, 4b, 4c trips for a certain cause, the post-trip controller 51 detects it and outputs a post-trip control signal 52 to the water level controller 15.

The water level controller 15 calculates based on the water level detection signal 12, the main steam flow rate signal 13 and the feedwater flow rate signal 14, and outputs a feedwater flow rate command signal 18 appropriate to the reactor water level setpoint signal 17 by comparing the calculated result with the reactor water level setpoint signal 17.

The water level controller 15 also outputs the feedwater flow rate command signal 18 based on the post-trip control signal 52, when one of the feedwater pumps 4a, 4b, 4c trips. Thereby, the feedwater flow rate command signal 18 increases, and lowering of the feedwater flow rate according to the trip is compensated by making the rotation speed of the electric motor driving other feedwater pumps not having tripped increase. More specifically, a setpoint of the flow rate controller 19 for the feedwater pumps which has not tripped and is under operation increases. Although the following description explains the case where the feedwater pump 4c trips, it is the same when other feedwater pump 4a, 4b trips.

Figure 10:
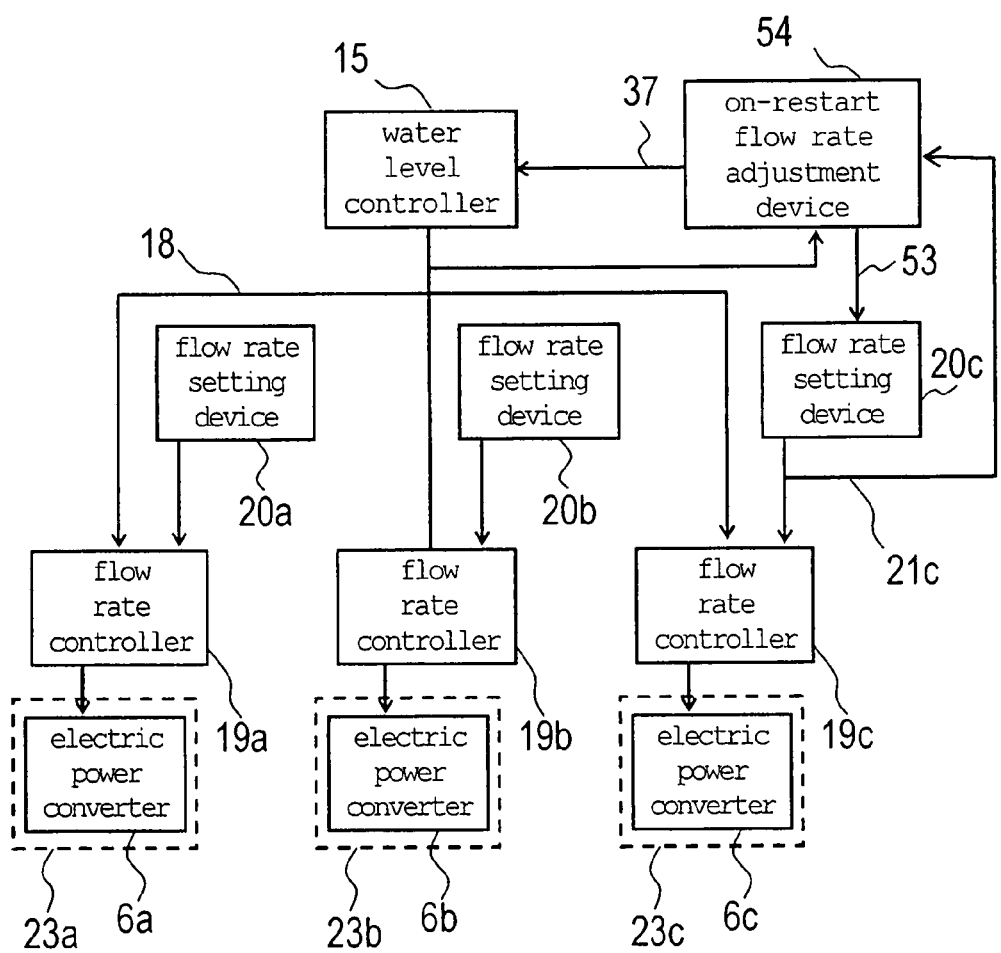
FIG. 10 is a block diagram of the on-restart flow rate adjustment device of the fourth embodiment of the present invention.

FIG. 10 is a block diagram of the on-restart flow rate adjustment device of this embodiment.

An on-restart flow rate adjustment device 54 outputs an increase signal 53 increasing at a constant rate the flow request signal for the flow rate controller 19c which controls the power converter 6c corresponding to the feedwater pump 4c having restarted after the trip. It also outputs a correction signal 37 having the same absolute value and the opposite sign to the increase signal 37 to the water level controller 15. It calculates the deviation of the feedwater supply command signal 18 transmitted by the water level controller 15 from the flow rate set signal 21c, and stops outputting the increase signal 53 and the correction signal 37 if this deviation is in a tolerance. And it switches the input for the flow rate controller 19c into the feedwater flow rate command signal 18 from the flow rate setting signal 21b.

As described above, the feedwater controller 7 compares the rotation speed command signal with the motor rotation speed, and decides that a pump having tripped and outputs the pump trip signal 30 if the situation of the large deviation continues. When a feedwater pump in operation trips, it also increases the feedwater supply command signal for the other two feedwater pumps not having tripped. It controls that the flow rate of the feedwater pump having started for a backup increases as the flow rate of other feedwater pumps decreases.

Therefore, it becomes possible to detect an impossibility of feeding water without the self-diagnosis function of the electric power converters. So, the scram according to a reactor water level low can be avoided more certainly. Also, since the timer 29 is installed, an unnecessary trip of the feedwater pump does not occur if the electric power converter can be restored by restart.

When one of the feedwater pumps 4a, 4b, 4c trips, the possibility of the scram according to the reactor water level low can be avoided by increasing the feedwater flow rate command for the feedwater pump not having tripped.

And since all of the feedwater 4a, 4b, 4c pumps are the primary feedwater pumps in the nuclear power plant of this embodiment, it is not necessary to start up quickly a feedwater pump in the state that the revolution has been stopped when one of them trips. So, it becomes possible to select the power supply of the most optimal capacity without being restrained by the output current limitation of the electric power converter and it is economical.

Since the feedwater pump having restarted is controlled as the rotation speed according to the feed water control signal automatically, the nuclear reactor feedwater can be supplied at stable flow rate continuously. In addition, by making the feedwater flow rate command of the pump in operation increase at the rate corresponding to the decrease of the backup in advance, the total feedwater flow rate is kept stable and the fluctuation of the reactor water level can be suppressed.

When a maintenance inspection is necessary for one of the feedwater pumps during operation, it is possible to maintain a rated feedwater flow rate by keeping the other two feedwater pumps in operation. The function of a flow control circuit makes it possible to return to the normal condition promptly, and it is easy to maintain.

Fifth Embodiment

Figure 11:
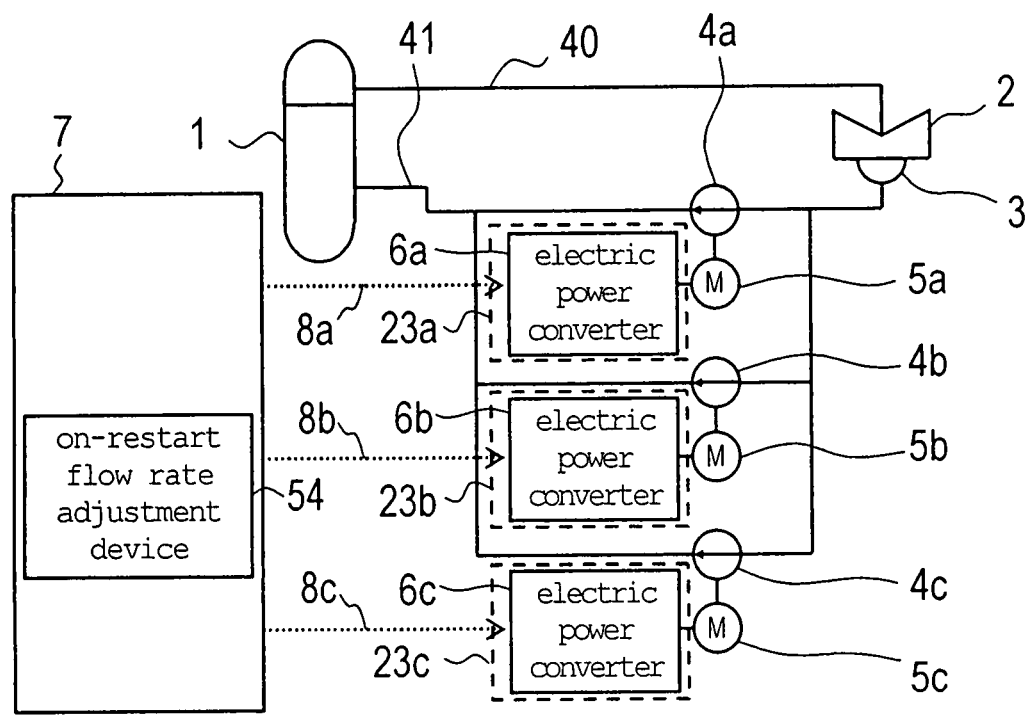
FIG. 11 is a system diagram of the nuclear power plant according to the fifth embodiment of the present invention.

FIG. 11 is a system diagram of the nuclear power plant according to the fifth embodiment of the present invention.

The feedwater controller 7 of this embodiment is same as the feedwater controller 7 of the fourth embodiment except that the trip detecting circuit and the controller 51 are excluded. With this feedwater controller 7, like the feedwater controller 7 of the fourth embodiment, it is controlled that the flow rate of the feedwater pump 4c having restarted after the trip increases as the flow rate of the other feedwater pumps 4a, 4b decreases.

Even with this feedwater controller 7, the operation of the feedwater pump 4c having restarted after the trip is switched automatically from the operation at the minimum speed to the controlled operation according to the electric power converter 6c. In addition, it is followed by the operation according to the feedwater supply command signal 18 automatically, the nuclear reactor feedwater can be supplied at stable flow rate continuously.

Also, by making the feedwater flow rate command signal 18 of the feedwater pumps 4a, 4b in operation decrease at a rate corresponding to the increase of the feedwater pump 4c having restarted after the trip, the total feedwater flow rate is kept stable and the fluctuation of the reactor water level can be suppressed. When a maintenance inspection is necessary for one of the feedwater pumps 4a, 4b, 4c during operation, it is possible to maintain a rated feedwater flow rate by keeping the other two feedwater pumps in operation. The function of the on-restart flow rate adjustment device 54 makes it possible to return to the normal condition promptly, and it is easy to maintain.

Sixth Embodiment

Figure 12:
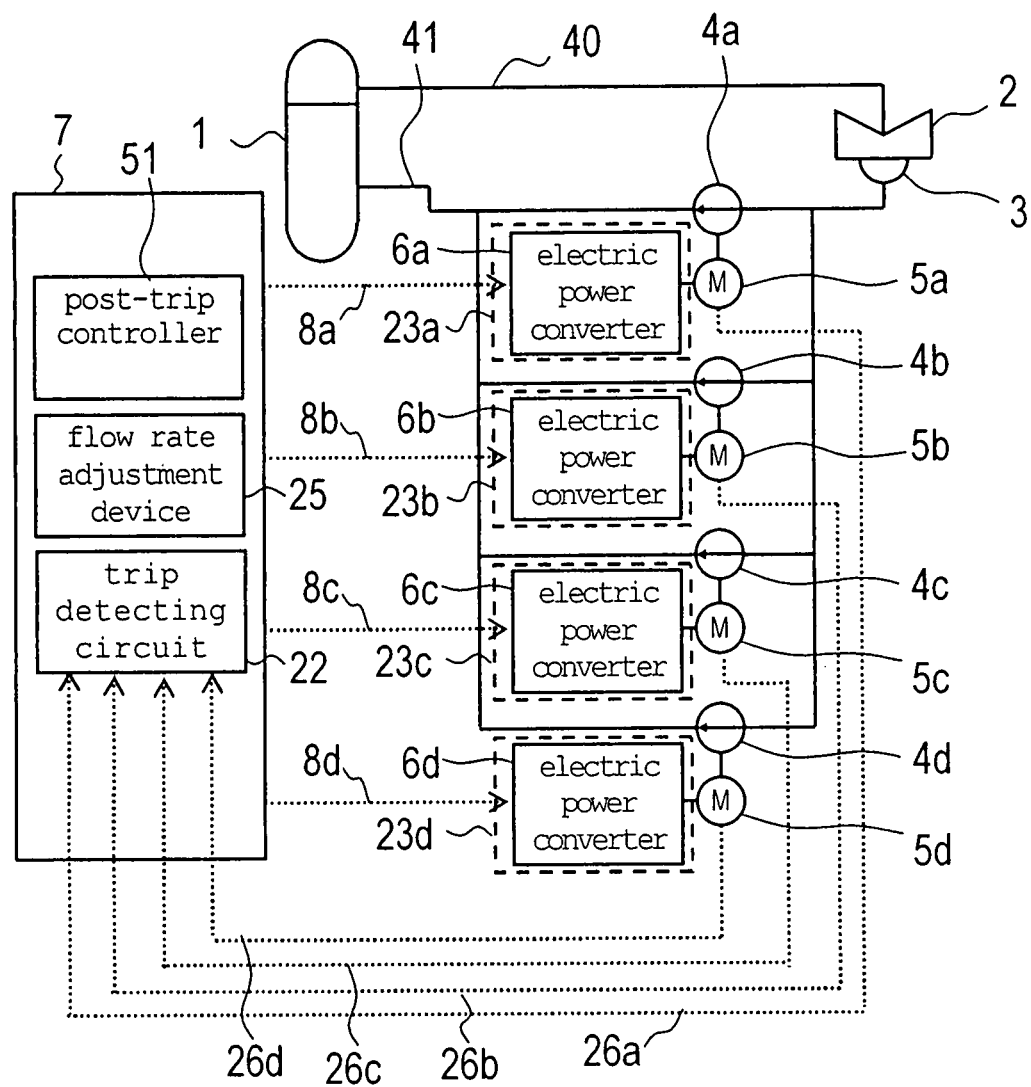
FIG. 12 is a system diagram of the nuclear power plant according to the sixth embodiment of the present invention.

FIG. 12 is a system diagram of the nuclear power plant according to the sixth embodiment of the present invention.

The nuclear power plant of this embodiment is same as the nuclear power plant of a fourth embodiment except that a feedwater pump 4d and an electric motors 5d driving this, the electric power converter 6d, the flow rate controllers 19d and the trip detecting circuits 22d. This feedwater pump 4d is provided in parallel with other feedwater pumps 4a, 4b, 4c. Each of the four feedwater pumps 4a, 4b, 4c, 4d have equal or more than one third of the total water supply to the reactor vessel 1. During the normal operation, all of the four feedwater pumps 4a, 4b, 4c, 4d are operated as primary feedwater pumps and each of the feedwater pumps supplies one fourth of the total water supply to the reactor vessel 1.

In case the number of primary feedwater pumps is three and one of the feedwater pumps trips, the feedwater flow rate of the other feedwater pumps must be increased from ⅓ to ½ of the total water supply. However, with the nuclear power plant of this embodiment, the feedwater flow rate is necessary to increase only from ¼ to ⅓ of the total water supply when one of the feedwater pumps 4a, 4b, 4c, 4d trips.

Therefore, the feedwater flow rate returns to a rated flow rate promptly after the trip of the feedwater pump. And a load of the electric motors 5a, 5b, 5c, 5d and the electric power converters 6a, 6b, 6c, 6d becomes smaller when one of the feedwater pumps 4a, 4b, 4c, 4d trips. So, it becomes possible to select the power supply of the most optimal capacity without being restrained by the output current limitation of the electric power converter and it is economical.

Other Embodiments

The above descriptions are examples and the present invention is not limited to the above-mentioned embodiments, but can be implemented in various configurations. For instance, although the above-mentioned embodiments are applied to the boiling water nuclear power plant as an example, it is also applicable to other type of nuclear power plant. In addition, it can be implemented with a combination of features of these embodiments.

What is claimed is:

1. A nuclear power plant, comprising:
a nuclear steam supply system including a nuclear reactor generating heat to produce steam;
a power generating turbine configured to be driven with the steam supplied by the nuclear steam supply system;
a condenser configured to condense the steam after driving the power generating turbine;
at least three feedwater pumps configured to supply water condensed and generated by the condenser to the nuclear steam supply system, each of the feedwater pumps is driven by a corresponding electric motor, and a flow rate provided by each of the feedwater pumps can be controlled by controlling a rotation speed of the corresponding electric motor, wherein during a normal operation of the reactor, one of the feedwater pumps is a backup feedwater pump standing by without operation and the other feedwater pumps are operating feedwater pumps;
a water level controller configured to calculate a feedwater flow rate to the nuclear steam supply system and to output a feedwater flow rate command signal based on a detected value indicating a condition of the nuclear power plant and a setpoint of a water level of the nuclear steam supply system;
at least three flow rate controllers equipped in correspondence with each electric motor, wherein each flow rate controller is configured to generate a rotation speed command signal of the corresponding electric motor based on the feedwater flow rate command signal, wherein each controller is configured to vary a speed of the corresponding electric motor such that a flow rate provided by each of the operating feedwater pumps can be varied;
at least three electric power converters configured to convert electricity from a power supply of fixed voltage and fixed frequency to supply electricity of variable voltage and variable frequency to the electric motors of the operating feedwater pumps; and
a trip compensation device configured to increase a rotation speed of the electric motor driving at least one of the operating feedwater pumps that has not tripped if one of the operating feedwater pumps trips;
wherein the trip compensation device has a backup start up circuit configured to start up the electric motor that drives the backup feedwater pump by directly connecting the electric motor to a power supply of fixed voltage and fixed frequency by bypassing the electric power converter of the backup feedwater pump if one of the operating feedwater pumps trips.

2. The nuclear power plant of claim 1, wherein the trip compensation device has a trip detecting circuit configured to determine if a feedwater pump has tripped, wherein the trip detecting circuit determines a trip if a deviation of the rotation speed of the electric motor, as indicated by the rotation speed command signal, continues to be equal to or more than a predetermined deviation for a predetermined period.

3. The nuclear power plant of claim 2, wherein the trip compensation device has a control switching device configured to disconnect the electric motor driving the backup feedwater pump from the power supply and to connect to the electric power converter after a predetermined period passes from a start up of the backup feedwater pump.

4. The nuclear power plant of claim 3, wherein the trip compensation device has a flow rate adjustment device configured to change a rotation speed of the electric motor driving the backup feedwater pump so that a rotation speed of the backup feedwater pump decreases with progress of time, and the water level controller is configured to output a command to change a rotation speed of a feedwater pump so as to compensate a change of the feedwater flow rate accompanying a decrease of the rotation speed of the backup feedwater pump.

5. The nuclear power plant of claim 2, wherein all of the feedwater pumps are primary feedwater pumps configured to be usually operated, and the trip compensation device has a post-trip controller configured to transmit a post-trip control signal increasing the feedwater flow rate indicated by the feedwater flow rate command signal to the water level controller if one of the feedwater pumps trips.

6. The nuclear power plant of claim 5, further comprising: an on-restart flow rate adjustment device configured to transmit the feedwater flow rate command signal increasing at a predetermined value per unit time to the flow rate controller corresponding to a feedwater pump that has tripped and to transmit a correction signal decreasing the feedwater flow rate at the predetermined value per unit time to the water level controller when the feedwater pump that has tripped restarts.

7. The nuclear power plant of claim 1, wherein all of the feedwater pumps are primary feedwater pumps configured to be usually operated, and the trip compensation device has a post-trip controller configured to transmit a post-trip control signal increasing the feedwater flow rate indicated by the feedwater flow rate command signal to the water level controller if one of the feedwater pumps trips.

8. The nuclear power plant of claim 7, further comprising: an on-restart flow rate adjustment device configured to transmit the feedwater flow rate command signal increasing at a predetermined value per unit time to the flow rate controller corresponding to a feedwater pump that has tripped and to transmit a correction signal decreasing the feedwater flow rate at the predetermined value per unit time to the water level controller when the feedwater pump that has tripped restarts.

9. The nuclear power plant of claim 1, further comprising:
a first connection directly between the power supply of fixed voltage and fixed frequency and the electric motor that drives the backup feedwater pump,
a second connection between the power supply of fixed voltage and fixed frequency, an electric power converter, and the electric motor that drives the backup feedwater pump, and
a control switching device configured to switch between the first connection and the second connection,
wherein the control switching device is configured to use the first connection when the operating feedwater pump trip occurs and is configured to subsequently use the second connection thereafter.

10. The nuclear power plant of claim 9, wherein each of the feedwater pumps, including the backup feedwater pump, has a control switching device, a first connection directly between the power supply and a respective electric motor, and a second connection between the power supply, a respective electric power converter, and a respective electric motor,
wherein each of the feedwater pumps is capable of being used as a primary or a backup feedwater pump.

11. The nuclear power plant of claim 9, wherein the first connection does not include an electric power converter between the power supply and the electric motor that drives the backup feedwater pump.

12. A feedwater controlling method of a nuclear power plant, the method comprising:

supplying water to a nuclear steam supply system, including a nuclear reactor generating heat to produce steam, via an arrangement having at least three feedwater pumps, each of the feedwater pumps is driven by a corresponding electric motor connected to (1) a corresponding electric power converter or (2) directly to a power supply of fixed voltage and fixed frequency, and a flow rate provided by each of the feedwater pumps can be controlled by controlling a rotation speed of the corresponding electric motor, wherein during a normal operation of the reactor, one of the feedwater pumps is a backup feedwater pump standing by without operation and the other feedwater pumps are operating feedwater pumps;

calculating a feedwater flow rate to the nuclear steam supply system and outputting a feedwater flow rate command signal based on a detected value indicating a condition of the nuclear power plant and a setpoint of a water level of the nuclear steam supply system;

generating rotation speed command signals of all of the operating electric motors based on the feedwater flow rate command signal, wherein a speed of each electric motor is variable such that a flow rate provided by each of the feedwater pumps can be varied;

converting electricity from a power supply of fixed voltage and fixed frequency with the corresponding electric power converters to supply electricity of variable voltage and variable frequency to the electric motors of the operating feedwater pumps; and using a trip compensation device to increase a rotation speed of the electric motor driving at least one of the operating feedwater pumps that has not tripped if one of the operating feedwater pumps trips;

wherein the trip compensation device has a backup start up circuit configured to start up the electric motor that drives the backup feedwater pump by directly connecting the electric motor to the power supply of fixed voltage and fixed frequency by bypassing the electric power converter of the backup feedwater pump if one of the operating feedwater pumps trips.

13. The feedwater controlling method of claim 12, further comprising the steps of:

using a first connection between the power supply of fixed voltage and fixed frequency and the electric motor that drives the backup feedwater pump when the operating feedwater pump trip occurs, and subsequently using thereafter a second connection between the power supply of fixed voltage and fixed frequency, an electric power converter, and the electric motor that drives the backup feedwater pump.

14. The feedwater controlling method of claim 13, wherein each of the feedwater pumps, including the backup feedwater pump, has a first connection directly between the power supply and a respective electric motor, and a second connection between the power supply, a respective electric power converter, and a respective electric motor, wherein each of the operating feedwater pumps and the backup feedwater pump is capable of being used as a primary or a backup feedwater pump by switching between the first connection and the second connection.

15. The feedwater controlling method of claim 13, wherein the first connection does not include an electric power converter between the power supply and the electric motor that drives the backup feedwater pump.

\* \* \* \* \*